US008462000B2

(12) United States Patent
Pan et al.

(10) Patent No.: US 8,462,000 B2
(45) Date of Patent: Jun. 11, 2013

(54) INFRARED CONTROL SYSTEM

(75) Inventors: Ya-Jun Pan, Shenzhen (CN); Yan-Hui Wu, Shenzhen (CN); Song-Lin Tong, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 500 days.

(21) Appl. No.: 12/786,695

(22) Filed: May 25, 2010

(65) Prior Publication Data

US 2011/0255872 A1 Oct. 20, 2011

(30) Foreign Application Priority Data

Apr. 15, 2010 (CN) .......................... 2010 1 0147757

(51) Int. Cl.
*G08B 23/00* (2006.01)
*G05B 11/01* (2006.01)
*G08C 19/16* (2006.01)
*G08C 19/12* (2006.01)

(52) U.S. Cl.
USPC .................... 340/573.2; 340/12.22; 340/12.5; 340/13.24

(58) Field of Classification Search
USPC ............ 340/539, 573.2, 706, 709; 358/194.1, 358/210; 455/575, 557; 250/205, 208.4, 214; 386/125, 126
See application file for complete search history.

(56) References Cited

U.S. PATENT DOCUMENTS

| | | | | |
|---|---|---|---|---|
| 4,143,368 | A * | 3/1979 | Route et al. | 340/543 |
| 4,178,549 | A * | 12/1979 | Ledenbach et al. | 375/238 |
| 4,371,814 | A * | 2/1983 | Hannas | 318/16 |
| 4,377,006 | A * | 3/1983 | Collins et al. | 398/106 |
| 4,430,652 | A * | 2/1984 | Rothenbuhler et al. | 340/12.17 |
| 4,959,721 | A * | 9/1990 | Micic et al. | 348/734 |
| 5,365,154 | A * | 11/1994 | Schneider et al. | 318/103 |
| 5,550,490 | A * | 8/1996 | Durham et al. | 326/98 |
| 5,602,535 | A * | 2/1997 | Boyles et al. | 340/5.22 |
| 6,529,138 | B2 * | 3/2003 | Satoh | 340/12.22 |
| 6,535,125 | B2 * | 3/2003 | Trivett | 340/539.13 |
| 7,638,743 | B2 * | 12/2009 | Bartol et al. | 250/205 |
| 7,945,289 | B2 * | 5/2011 | Sanders et al. | 455/557 |
| 2005/0249484 | A1 * | 11/2005 | Ng et al. | 386/125 |

* cited by examiner

*Primary Examiner* — Nam V Nguyen
(74) *Attorney, Agent, or Firm* — Altis Law Group, Inc.

(57) ABSTRACT

An exemplary infrared control system includes an infrared control unit and a computer. The infrared control unit is capable of transmitting an infrared signal. The computer includes an infrared response unit, and the infrared response unit includes an infrared receiving circuit and a control circuit electrically connected to the infrared receiving circuit. The infrared receiving circuit is capable of receiving the infrared signal from the infrared control unit. Accordingly the control circuit is capable of processing the infrared signal from the infrared receiving circuit to generate a corresponding command signal to control the computer to power on/off or reset.

20 Claims, 3 Drawing Sheets

INFRARED CONTROL SYSTEM

BACKGROUND

1. Technical Field

The disclosure generally relates to control systems, and more particularly relates, to an infrared control system for remotely controlling a computer.

2. Description of the Related Art

Generally, computers are controlled through keyboards or touchpads. In either case physical contact is required between the user and the computer. However, it can be inconvenient to have to physically contact the computer each time to use it.

Therefore, there is room for improvement within the art.

BRIEF DESCRIPTION OF THE DRAWINGS

Many aspects of an infrared control system can be better understood with reference to the following drawings. The components in the drawings are not necessarily drawn to scale, the emphasis instead being placed upon clearly illustrating the principles of the exemplary infrared control system. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
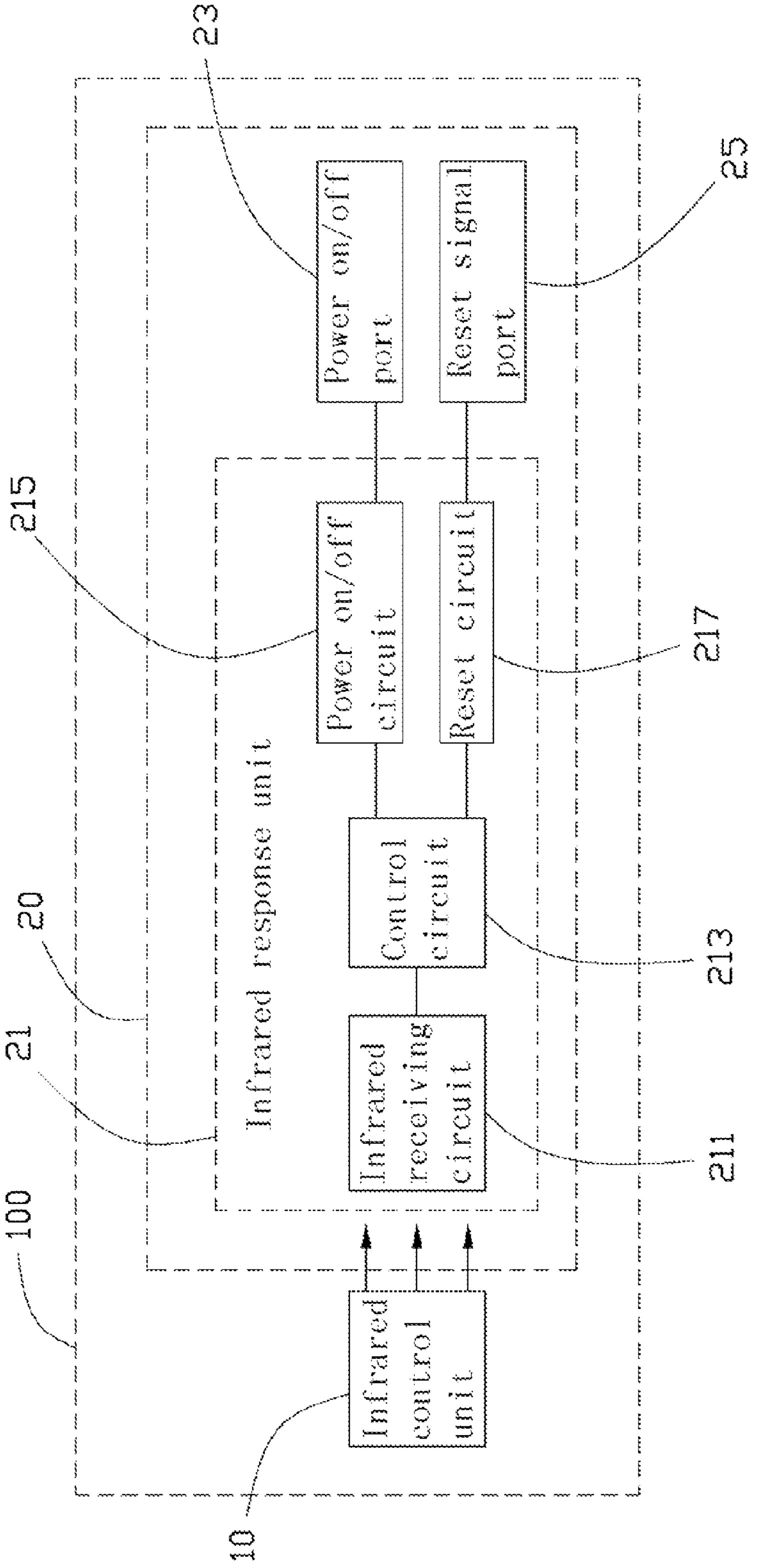
FIG. 1 is a block view of an infrared control system including an infrared control unit and a computer, according to an exemplary embodiment.

FIG. 1 shows an exemplary embodiment of an infrared control system 100, which includes an infrared control unit 10 and a computer 20 communicating with the infrared control unit 10 using infrared signals. The computer 20 includes an infrared response unit 21, a power on/off port 23, and a reset signal port 25; among them, the infrared response unit 21 is electrically connected to the power on/off port 23 and the reset signal port 25.

The infrared response unit 21 includes an infrared receiving circuit 211, a control circuit 213, a power on/off circuit 215, and a reset circuit 217. The control circuit 213 is electrically connected to the infrared receiving circuit 211, the power on/off circuit 215, and the reset circuit 217. The power on/off circuit 215 is electrically connected to the power on/off port 23, and the reset circuit 217 is electrically connected to the reset signal port 25.

The infrared control unit 10 can be integrated with an existing infrared remote controller and is capable of transmitting infrared signals. The infrared receiving circuit 211 receives the infrared signals from the infrared control unit 10 and then decodes the infrared signals. The control circuit 213 receives and processes the infrared signals from the infrared receiving circuit 211 to generate corresponding command signals. The command signals are transmitted to the power on/off circuit 215 or the reset circuit 217 to power the computer 20 on/off or reset the computer 20.

Figure 2:
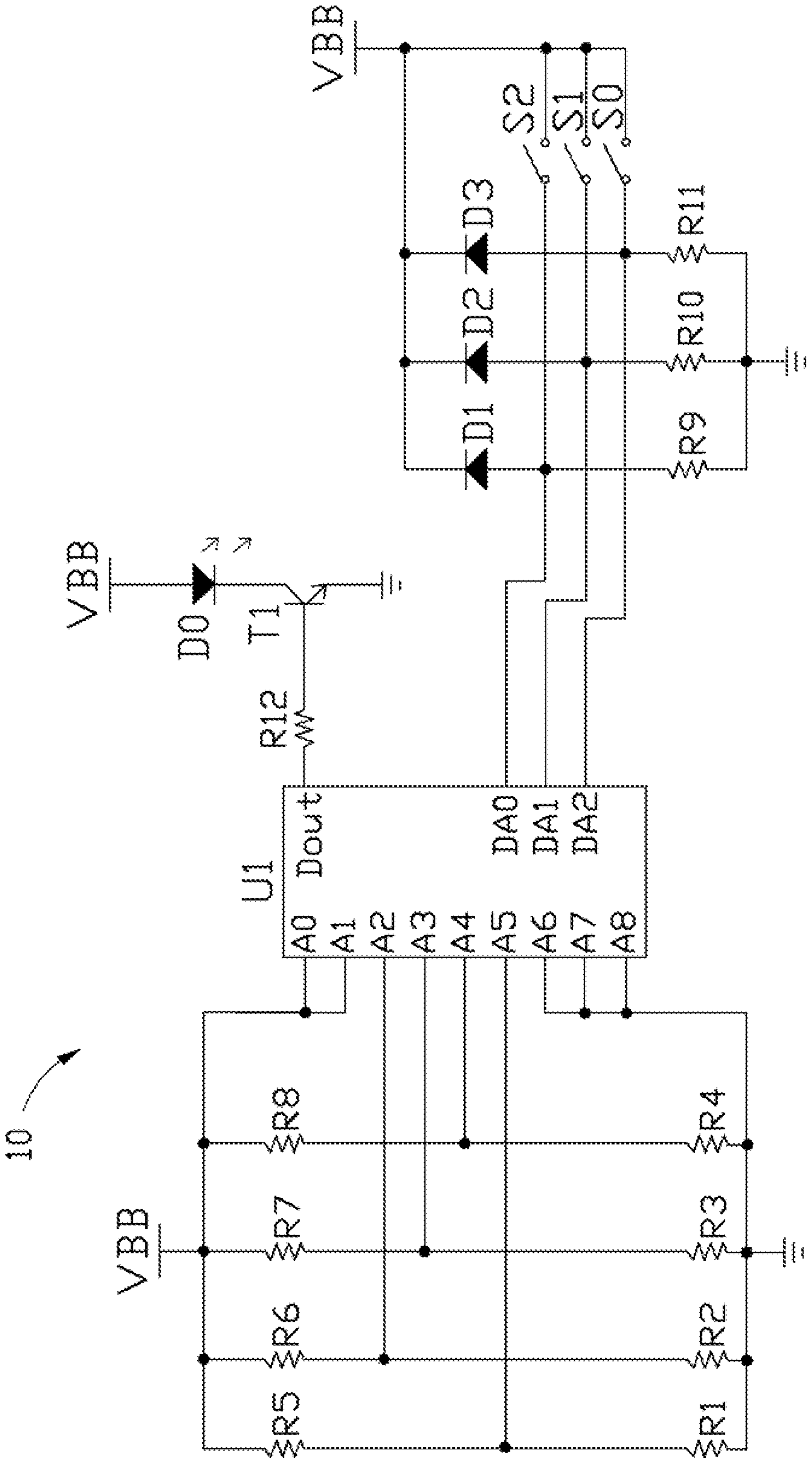
FIG. 2 is a circuit view of the infrared control unit of the infrared control system shown in FIG. 1.

Also referring to FIG. 2, the infrared control unit 10 includes an encoder U1, a switch module with switches S0-S2, a first transistor T1, three diodes D1-D3, twelve resistors R1-R12, and a light emitting diode (LED) D0. The encoder U1 may be a PT2262-M3L3 encoder and includes nine first address ports A0-A8, three encoding input ports DA0-DA2, and an output port Dout. Among the address ports A0-A8, the resistors are series connected in pairs R1:R5, R2:R6, R3:R7, R4:R8 and all the pairs are connected together in parallel. The node between resistors R5-R8 is electrically connected to a first power source VBB, and the node between resistors R1-R4 is connected to ground. The resistors R1-R4 have the same resistance value, the resistors R5-R8 have the same resistance value, and the resistors R9-R11 have the same resistance value.

The first address ports A0 and A1 are electrically connected to the first power source VBB. The first address port A2 is electrically connected to the node between the resistors R2 and R6, the first address port A3 is electrically connected to the node between the resistors R3 and R7, the first address port A4 is electrically connected to the node between the resistors R4 and R8, and the first address port A5 is electrically connected to the node between the resistors R1 and R5. The first address ports A6-A8 are electrically connected to ground.

The anode of the diode D1 is electrically connected to the resistor R9 in series, the anode of the diode D2 and the resistor R10 are connected in series and together connected in parallel to the diode D1 and the resistor R9, and the anode of the diode D3 and the resistor R11 are connected in series and together connected in parallel to the diode D2 and the resistor R10. The cathodes of the diodes D1-D3 are electrically connected to the first power source VBB. The resistors R9-R12 are electrically connected to ground.

The encoding input port DA0 of the encoder U1 is electrically connected to the node between the anode of the diode D1 and the resistor R9 and electrically connected to one end of the switch S2, and another end of the switch S2 is electrically connected to the first power source VBB. The encoding input port DA1 of the encoder U1 is electrically connected to the node between the anode of the diode D2 and the resistor R10 and electrically connected to one end of the switch S1. Another end of the switch S1 is electrically connected to the first power source VBB. The encoding input port DA2 of the encoder U1 is electrically connected to the node between the anode of the diode D3 and the resistor R11 and electrically connected to one end of the switch S0, and another end of the switch S0 is electrically connected to the first power source VBB.

The LED D0 may be an infrared LED in this embodiment. The first transistor T1 may be an npn transistor in this embodiment. The base of the first transistor T1 is electrically connected to the resistor R12 and the output port Dout of the encoder U1 in series. The emitter of the transistor T1 is connected to ground, and the collector of the transistor T1 is electrically connected to the cathode of the LED D0. The anode of the LED D0 is electrically connected to the first power source VBB. The first power source VBB can be supplied by an existing 5V battery.

In this exemplary embodiment, when pressed, the switches S0-S2 are associated with the operation states of the computer 20. When the switches S0, S1, and S2 are not pressed, the computer 20 maintains a predetermined operating state. When the switch S0 is pressed, the computer 20 is powered on. When the switch S1 is pressed, the computer 20 is powered off; when the switch S2 is pressed, the computer 20 is reset. Thereby, when any one switch among the switches S0-S2 is pressed, the associated encoding input port DA0, DA1, or DA2 receives corresponding input voltage provided by the first power source VBB, so the associated encoding input port DA0, DA1, or DA2 goes high level.

Providing that 1 represents high level and 0 represents low level, then the encoding input ports DA0-DA2 of the encoder U1 have logical combinations based on the pressed switch module S0-S2 as follows: when no switches S0-S2 are pressed, the logical combination of the encoding input ports DA0-DA2 is 000; when the switch S0 is pressed, the logical combination of the encoding input ports DA0-DA2 is 001; when the switch S1 is pressed, the logical combination of the encoding input ports DA0-DA2 is 010; when the switch S2 is pressed, the logical combination of the encoding input ports DA0-DA2 is 100. The encoder U1 encodes the logical combinations to generate corresponding address codes and data codes, and the LED D0 transmits the address codes and the data codes to the infrared receiving circuit 211 using infrared signals.

Figure 3:
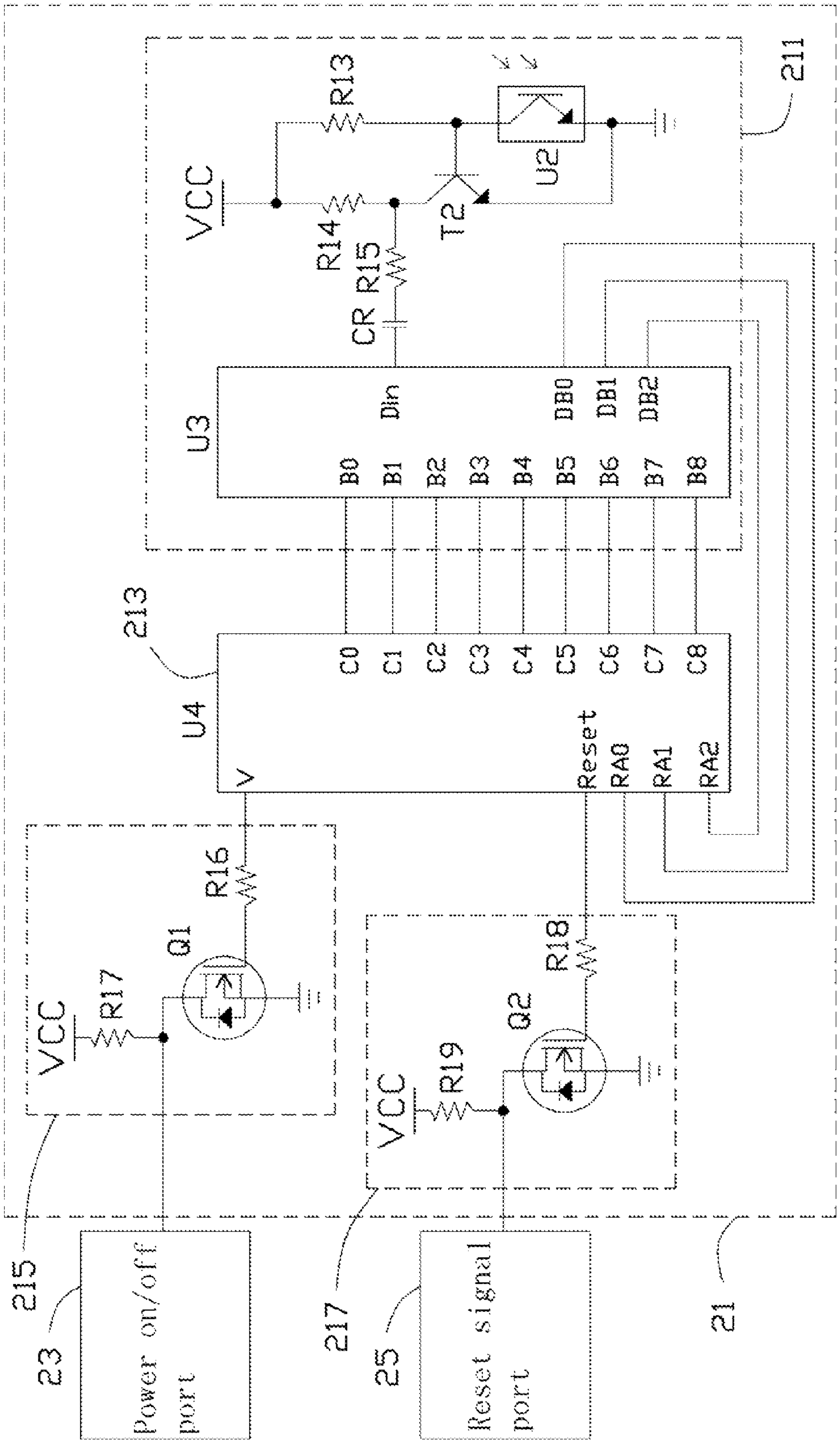
FIG. 3 is a circuit view of an infrared response unit of the computer shown in FIG. 1.

Also referring to FIG. 3, the infrared receiving circuit 211 includes an infrared probe U2, a second transistor T2, a decoder U3, a capacitor CR, and three resistors R13, R14, and R15. The second transistor T2 can be an npn transistor in this embodiment. The infrared probe U2 is electrically connected between the base and the emitter of the second transistor T2 and is capable of receiving infrared signals including logical combinations. The emitter of the second transistor T2 is electrically connected to ground, and the base of the second transistor T2 is electrically connected to a second power source VCC through the resistor R13. The collector of the second transistor T2 is electrically connected to one end of the resistor R14 and one end of the resistor R15, another end of the resistor R14 is electrically connected to the second power source VCC, another end of the resistor R15 is electrically connected to one end of the capacitor CR, and another end of the capacitor CR is electrically connected to the decoder U3.

The decoder U3 may be a PT2272-M3L3 decoder and includes nine second address ports B0-B8, a decoding input port Din, and three decoding output ports DB0-DB2. The decoding input port Din is electrically connected to the collector of the second transistor T2 through the capacitor CR and the resistor R15 in turn. The second address ports B0-B8 and the decoding output ports DB0-DB2 are electrically connected to the control circuit 213. Thereby, when the infrared probe U2 of the infrared receiving circuit 211 receives the encoded infrared signals from the infrared control circuit 10, the infrared signals are transmitted to the decoding input port Din and are decoded to generate corresponding address codes and data codes.

The control circuit 213 includes a control chip U4, which can be a PIC16F73 control chip and includes nine third address ports C0-C8, three data ports RA0-RA2, a power control port V, and a reset control port Reset. In this exemplary embodiment, the third address ports C0-C8 are electrically connected to the second address ports B0-B8, respectively, for receiving the address codes from the decoder U3. For example, the address port B0 is electrically connected to the address port C0, and the address port B2 is electrically connected to the address port C2. The data ports RA0-RA2 are electrically connected to the decoding output ports DB0-DB2, respectively, for receiving the data codes from the decoder U3. The power control port V is electrically connected to the power on/off circuit 215 and is capable of outputting a corresponding command signal according to the address code and the data code to power the computer 20 on/off. The reset control port Reset is electrically connected to the reset circuit 217 and is capable of outputting a corresponding command signal according to the address code and the data code to reset the computer 20.

The power on/off circuit 215 includes a first field effect transistor (FET) Q1 and two resistors R16 and R17. The gate of the first FET Q1 is electrically connected to the power control port V through the resistor R16 to receive the corresponding command signals. The source of the first FET Q1 is electrically connected to ground and the drain of the first FET Q1 is electrically connected to the second power source VCC through the resistor R17. The drain of the first FET Q1 is further electrically connected to the power on/off port 23 of the computer 20 to transmit the command signals to the computer 20, for powering the computer 20 on/off.

The reset circuit 217 includes a second FET Q2 and two resistors R18 and R19. The gate of the second FET Q2 is electrically connected to the reset control port Reset through the resistor R18 for receiving the corresponding command signals. The source of the second FET Q2 is electrically connected to ground and the drain of the second FET Q2 is electrically connected to the second power source VCC through the resistor R19. The drain of the second FET Q2 is further electrically connected to the reset signal port 25 of the computer 20 to transmit the command signals to the computer 20, for resetting the computer 20.

In use, when any one switch among the switch module S0-S2 is pressed, the corresponding encoding input port among DA0-DA2 receives a logical combination, such as 001 or 010. Then the encoder U1 encodes the logical combinations to generate corresponding address codes and data codes, and the LED D0 transmits the address codes and the data codes to the infrared receiving circuit 211 in the form of infrared signals. The infrared probe U2 of the infrared receiving circuit 211 receives and decodes the encoded infrared signals, and the decoded infrared signals are transmitted to the control circuit 213 through the second address ports B0-B8 and the decoding output ports DB0-DB2. The control circuit 213 receives the decoded infrared signals and outputs corresponding command signals based on the corresponding logical combination to control the computer 20. For example, when the infrared receiving circuit 211 receives the logical code 001, namely, the switch S0 is pressed, then the control circuit 213 outputs a corresponding command signal according to the logical code 001 to the power on/off circuit 215. Thus, the computer 20 is powered on according to the command signal.

In summary, in this exemplary embodiment, the resistors R9-R19, the capacitor CR, and the diodes D1-D3 can be omitted.

In the infrared control system 100 of the exemplary embodiment, the infrared control unit 10 encodes different infrared signals and outputs the encoded infrared signals to the computer 20, the infrared receiving circuit 211 of the computer 20 receives and decodes the infrared signals. Thus, the control circuit 213 of the computer 20 receives the decoded infrared signals from the infrared receiving circuit 211 to generate corresponding command signals, resulting in powering computer 20 on/off or resetting the computer 20.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. An infrared control system, comprising:

an infrared control unit for transmitting an infrared signal, the infrared control unit comprising an encoder, a switch module electrically connected to the encoder, a first transistor and an infrared LED; the encoder comprises three encoding input ports, an output port; one end of the switch module is electrically connected to a first power source, and another end of the switch module is electrically connected to the encoding input ports; the first transistor is electrically connected to the output port, and the first power source is electrically connected to the first transistor through the infrared LED; and a computer comprising an infrared response unit, a power on/off port and a reset signal port; the infrared response unit comprising an infrared receiving circuit, a control circuit electrically connected to the infrared receiving circuit;

wherein when a different switch of the switch module is pressed, one of the encoding input ports receives a logic combination from the switch module, the encoder encodes the logic combination to generate corresponding codes, the infrared LED transmits the corresponding codes to the infrared receiving circuit in the form of the infrared signal; the control circuit processes the infrared signal from the infrared receiving circuit to generate a corresponding command signal to one of the power on/off port and the reset signal port to control the computer.

2. The infrared control system as claimed in claim 1, wherein the encoder further comprises nine first address ports receiving different level signals, the nine first address ports are electronically connected to the first power source.

3. The infrared control system as claimed in claim 2, wherein the base of the first transistor is electrically connected to the output port, the emitter of the first transistor is electrically connected to ground, the collector of the first transmitter is electrically connected to the cathode of the infrared LED, and the anode of the infrared LED is electrically connected to the first power source.

4. The infrared control system as claimed in claim 1, wherein the infrared receiving circuit comprises an infrared probe, a second transistor, and a decoder, the infrared probe is electrically connected between the base and the emitter of the second transistor and is capable of receiving an infrared signal, the emitter of the second transistor is also electrically connected to ground, the base of the second transmitter is also electrically connected to a second power source, and the collector of the second transmitter is electrically connected to the second power source and the decoder.

5. The infrared control system as claimed in claim 4, wherein the decoder comprises nine second address ports, a decoding input port, and three decoding output ports, the decoding input port is electrically connected to the collector of the second transistor, and the second address ports and the decoding output ports are electrically connected to the control circuit.

6. The infrared control system as claimed in claim 5, wherein the infrared probe receives the encoded infrared signals from the infrared control circuit, the infrared signals are transmitted to the decoding input ports and are decoded to generate corresponding address codes and data codes, and the address codes and the data codes are transmitted to the control circuit.

7. The infrared control system as claimed in claim 6, wherein the control circuit comprises a control chip, the control chip comprises nine third address ports and three data ports, the third address ports are electrically connected to the second address ports, respectively, for receiving the address codes from the decoder, and the data ports are electrically connected to the decoding output ports, respectively, for receiving the data codes from the decoder.

8. The infrared control system as claimed in claim 7, wherein the control chip further comprises a power control port, and a reset control port, the power control port is capable of outputting a corresponding command signal according to the address code and the data code to power the computer on/off, and the reset control port is capable of outputting a corresponding command signal according to the address code and the data code to reset the computer.

9. The infrared control system as claimed in claim 8, wherein the Infrared response circuit further comprises a power on/off circuit and a reset circuit, the power control port is electrically connected to the power on/off circuit to transmit the power command signal, and the reset control port is electrically connected to the reset circuit to transmit the reset command signal.

10. The infrared control system as claimed in claim 9, wherein the power on/off circuit is electrically connected to the power on/off port to turn the computer on/off, and the reset signal port is electrically connected to the reset circuit to reset the computer.

11. The infrared control system as claimed in claim 9, wherein the power on/off circuit comprises a first FET, the gate of the first FET is electrically connected to the power control port to receive the corresponding command signal, the source of the first FET is electrically connected to ground, and the drain of the first FET is electrically connected to the second power source and further connected to the power on/off port to transmit the corresponding command signal.

12. The infrared control system as claimed in claim 9, wherein the reset circuit comprises a second FET, the gate of the second FET is electrically connected to the reset control port for receiving the corresponding command signal, the source of the second FET is electrically connected to ground, and the drain of the second FET is electrically connected to the second power source and further connected to the reset signal port to transmit the corresponding command signal for resetting the computer.

13. An infrared control system, comprising:

an infrared control unit for transmitting an infrared signal, the infrared control unit comprising an encoder, a switch module electrically connected to the encoder, a first transistor and an infrared LED; the encoder comprises three encoding input ports, and an output port; the switch module comprises a plurality of switches; one end of the switch module is electrically connected to a first power source, and another end of the switch module is electrically connected to the encoding input ports; the output port is grounded through the first transistor, the first power source is electrically connected to the first transistor through the infrared LED; and a computer communicating with the infrared control unit using infrared signals, the computer comprising an infrared response unit, a power on/off port and a reset signal port; the infrared response unit comprising an infrared receiving circuit, a control circuit electrically connected to the infrared receiving circuit;

wherein when a different switch of the plurality of switches is pressed, one of the encoding input ports receives a logic combination from the switch module, the encoder encodes the logic combination to generate corresponding codes, the infrared LED transmits the corresponding codes to the infrared receiving circuit in the form of the infrared signal; the infrared receiving circuit receives and decodes the infrared signal from the infrared control unit, the control circuit processes the decoded infrared signal from the infrared receiving circuit to generate a corresponding command signal to one of the power on/off port and the reset signal port to control the computer to power on/off or reset.

14. The infrared control system as claimed in claim 13, wherein the infrared receiving circuit comprises an infrared probe, a transistor, and a decoder, the infrared probe is capable of receiving the encoded infrared signals from the infrared control circuit, the infrared probe is electrically connected between the base and the emitter of the transistor and is capable of receiving an infrared signal, the emitter of the transistor is electrically connected to ground, the base of the first transistor is electrically connected to a second power source, and the collector of the first transistor is electrically connected to the second power source and the decoder.

15. The infrared control system as claimed in claim 14, wherein the decoder comprises nine second address ports, a decoding input port, and three decoding output ports, the decoding input port is electrically connected to the collector of the second transistor, the second address ports and the decoding output ports are electrically connected to the control circuit, the infrared signals are transmitted to the decoding input ports and are decoded to generate corresponding address codes and data codes, and the address codes and the data codes are transmitted to the control circuit.

16. The infrared control system as claimed in claim 15, wherein the control circuit comprises a control chip, the control chip comprises nine third address ports and three data ports, the third address ports are electrically connected to the second address ports, respectively, for receiving the address codes from the decode, and the data ports are electrically connected to the decoding output ports, respectively, for receiving the data codes from the decoder.

17. The infrared control system as claimed in claim 16, wherein the control chip further comprises a power control port, and a reset control port, the power control port is capable of outputting a corresponding command signal according to the address code and the data code to power the computer on/off, and the reset control port is capable of outputting a corresponding command signal according to the address code and the data code to reset the computer.

18. The infrared control system as claimed in claim 13, wherein the infrared response circuit further comprises a power on/off circuit and a reset circuit, the power control port is electrically connected to the power on/off circuit to transmit the power command signal for powering the computer on/off, and the reset control port is electrically connected to the reset circuit to transmit the reset command signal for resetting the computer.

19. The infrared control system as claimed in claim 18, wherein the power on/off circuit is electrically connected to the power on/off port to turn the computer on/off, and the reset signal port is electrically connected to the reset circuit to reset the computer; the power on/off circuit comprises a first FET, the gate of the first FET is electrically connected to the power control port to receive the corresponding command signal, the source of the first FET is electrically connected to ground, and the drain of the first FET is electrically connected to the second power source and further connected to the power on/off port to transmit the corresponding command signal.

20. The infrared control system as claimed in claim 19, wherein the reset circuit comprises a second FET, the gate of the second FET is electrically connected to the reset control port for receiving the corresponding command signal, the source of the second FET is electrically connected to ground, and the drain of the second FET is electrically connected to the second power source and further connected to the reset signal port to transmit the corresponding command signal for resetting the computer.

* * * * *